United States Patent [19]
Leto, Jr. et al.

[11] Patent Number: 4,772,070
[45] Date of Patent: Sep. 20, 1988

[54] CONTOURED SEAT COVERING FOR AUTOMOTIVE VEHICLE BENCH SEAT

[76] Inventors: James Leto, Jr., 4269 Frying Pan Rd., Basalt, Colo. 81621; Anthony Brady, 11916 Woodruff, Downey, Calif. 90241

[21] Appl. No.: 128,290

[22] Filed: Dec. 3, 1987

[51] Int. Cl.$^4$ .............................................. A47C 27/00
[52] U.S. Cl. ................................. 297/219; 297/218; 297/459; 297/460
[58] Field of Search ............... 297/219, 218, 458, 459, 297/460, 452; 5/464

[56] References Cited

U.S. PATENT DOCUMENTS

| | | | |
|---|---|---|---|
| 2,782,839 | 2/1957 | Cole | 297/219 |
| 4,679,851 | 7/1987 | Solie et al. | 297/219 X |
| 4,693,511 | 9/1987 | Seltzer et al. | 297/219 |
| 4,718,721 | 1/1988 | Pompa | 297/219 |

FOREIGN PATENT DOCUMENTS 406319 12/1967 Australia .............................. 297/219

*Primary Examiner*—James T. McCall
*Attorney, Agent, or Firm*—Charles H. Thomas

[57] ABSTRACT

A contoured seat cover is provided which converts a bench seat assembly of an automative vehicle into a seat containing simulated bucket seats. The seat cover includes a seat back cover and a seat bench cover, both of which include a plurality of separate fabric panels sewn together. The seat back cover has protrusions at the lateral extremities of the seat back which are filled with raised foam cushioning and which form shoulder cradles. At least one raised back position divider divides the seat back into a plurality of occupant back rest positions. Likewise, the seat bench cover includes upwardly projecting occupant posterior position delineating protrusions at its lateral extremities and at least one intermediate divider, filled with foam, which divides the seat cover into occupant posterior support positions that are laterally aligned with the occupant back rest positions of the seat back cover. Forwardly projecting lumbar supports are provided in the lumbar region of each occupant back rest position.

17 Claims, 5 Drawing Sheets

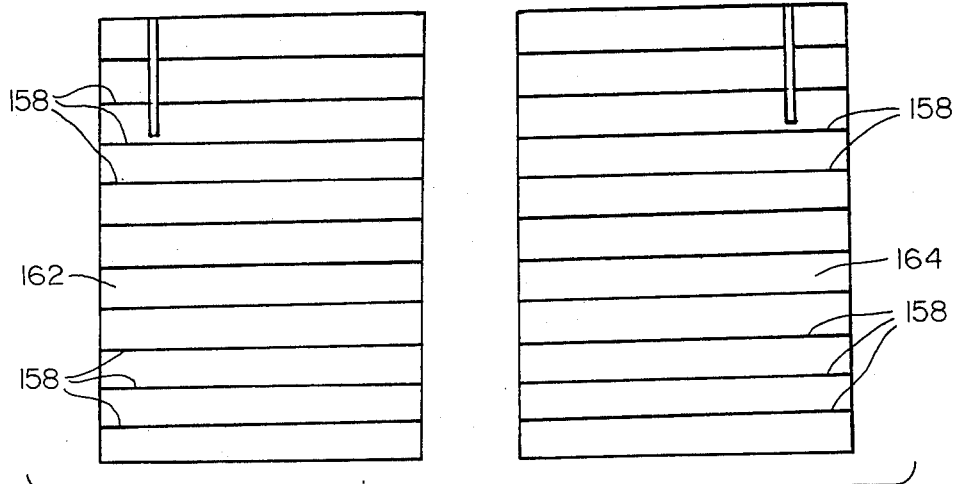
FIG. 9
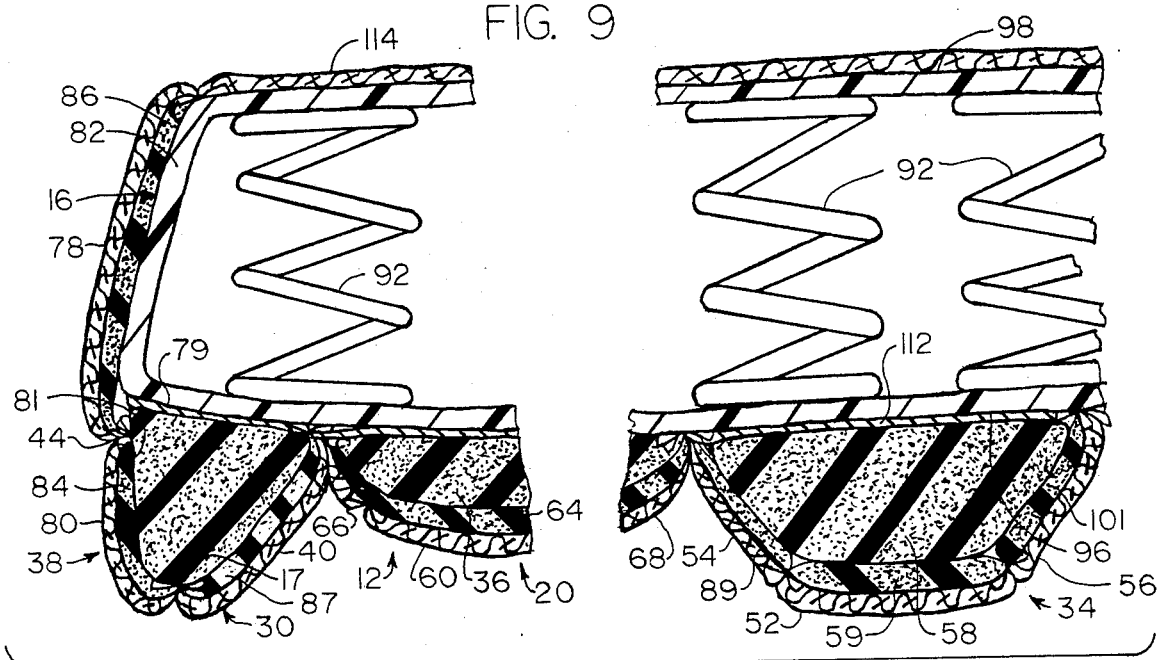
FIG. 6    FIG. 4
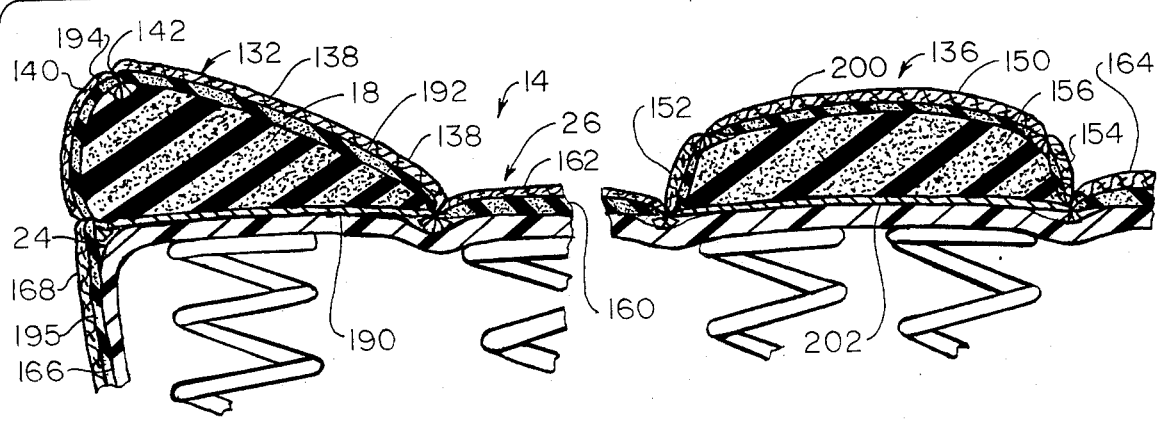

CONTOURED SEAT COVERING FOR AUTOMOTIVE VEHICLE BENCH SEAT

BACKGROUND OF THE INVENTION

1. Field of the Invention

The present invention relates to an improved form of contoured fabric seat covers for covering bench seat assemblies of automotive vehicles.

2. Description of the Prior Art

For many years automotive vehicle seat covers have been provided as aftermarket accessories for use with automotive vehicles. Conventional seat covers are provided either to upgrade factory seat covers in order to improve the appearance of the vehicle seats, or as a covering to conceal original seat covers which have deteriorated with use.

Many conventional automotive vehicle seat covers are designed to accommodate a number of different vehicles. Consequently, such covers are generally constructed as loose fitting, shroud-like structures which only generally conform to the shape of the automotive vehicle seat which is to be covered. Conventional covers are frequently constructed overly loose so as to be able to cover as many different types of vehicle seats as possible. One exemplary cover of this type is a cover formed as a real or simulated sheep skin.

One significant problem with conventional seat covers for automotive vehicles is the pronounced tendency for such covers to slide upon the seat. This not only detracts from the appearance of the covered seat, but more importantly presents a significant safety hazard when the vehicle stops suddenly or swerves in traffic. In such situations a person seated on such a conventional cover is much more likely to slide into the vehicle dashboard or windshield than will a person seated in an automotive vehicle seat without a conventional cover.

SUMMARY OF THE INVENTION

The present invention is a contoured seat cover for an automotive vehicle which has a number of particularly advantageous features which have heretofore been absent from conventional automotive vehicle seat covers.

One important object of the present invention is to provide a contoured seat cover which is especially adapted for converting a bench seat assembly of an automotive vehicle into a seat assembly which defines separate occupant seating positions. While at one time the vast majority of automotive vehicles manufactured employed bench style seats, at present the great majority of passenger automobiles are manufactured with front seats which are bucket type seats. Bucket seats are typically provided with forwardly projecting ridges on either side of the occupant's shoulders, and raised ridges on either side of the seat occupant's thighs. This configuration for a bucket seat is not only aesthetically pleasing to occupants of an automotive vehicle, but serves the function of providing some lateral support so as to prevent an occupant from being jostled from side to side when the vehicle swerves or makes sharp turns.

While automotive vehicle manufacturers have largely converted the front seats of automobiles from bench type seating to bucket seats, bench type seats are still widely used in the cabs of trucks, particularly pick-up trucks. Vehicle manufacturers have been somewhat reluctant to equip pick-up trucks with bucket seats since such a seating configuration provides an extreme limitation on the seating capacity in the cab of a pick-up truck which has no rear seat. Most owners of pick-up trucks are reluctant to permanently sacrifice the extra seating capacity of a bench-type seat for the riding comfort and aesthetically pleasing appearance of bucket seats.

One object of the present invention is to provide a system for selectively and temporarily converting a bench type seating arrangement in an automotive vehicle to a seating configuration which provides individual seating positions including the lateral shoulder and thigh support which has heretofore been characteristic only of bucket seats. The individual seating positions are formed by separate covers on both the seat back and the seat bench. Each of the covers includes separate fabric panels sewn together so as to define forwardly projecting occupant back rest delineating protrusions which laterally support the shoulders of an individual, and upwardly projecting posterior postion delineating protrusions which provide lateral support to the thighs of individuals seated on the seat. Both the occupant back rest position delineating protrusions and the posterior position delineating protrusions are located at the opposite lateral ends of the bench seat in lateral alignment with each other. The demarcations between the several occupant seating positions are defined by forwardly projecting occupant back rest position dividers and upwardly projecting occupant posterior position dividers which are in lateral alignment with the back rest position dividers. Each of the projecting portions of the fabric covers necessarily defines a cavity, which is filled with foam cushioning material to hold the proper shape of the projection.

Another object of the invention is to provide a contoured seat cover for an automotive vehicle bench seat assembly which may be removably installed on the bench seat assembly without removing either the seat back or the seat bench from the vehicle. The seat back cover is formed generally in the shape of an envelope or close fitting sack configured to snugly receive the seat back therewithin. The envelope is closed on three sides by the contoured front portion, and by a rear portion which is formed of fabric and sewn to the front portion along the top and at both lateral edges. The lower edges of both the front portion and the rear portion of the seat back cover define a mouth such that the seat back cover may be installed upon the vehicle seat cover from the top. The lower edges of the front and rear portions of the seat back cover are wrapped around the lower edge of the seat back in overlapping fashion. Releasable fastening means, preferably in the form of Velcro fastening strips, are used to releasably secure the lower edges of the front and rear portions together, so that the seat back cover totally encapsulates the vehicle seat back. The lower edges of the front and rear portions meet behind the crevice formed by the intersection of the seat back and the seat bench of the seat bench assembly, thereby concealing the closed mouth of the seat back cover.

The seat bench cover includes a contoured mantle, formed of separate, discrete fabric panels sewn together, and including a contoured top portion and also depending edges or skirt portions. Both longitudinal and transverse straps are permanently attached to the edges of the mantle. The strap sections are coupled together by means of releasable fastening clasps beneath the seat bench. The mantle may be installed from the top the seat bench and the clasps on the straps may be secured by reaching under the seat bench while the seat bench remains in position installed within the vehicle. Thus, the seat bench cover, as well as the seat back cover, may both be installed on the automotive vehicle seat assembly without removing any portion of the seat from the vehicle. This feature allows a user to removably install the contoured seat cover of the invention for use to define separate occupant seating positions. Alternatively, however, the contoured seat cover of the invention may be quickly removed in a matter of minutes by a single individual if the bench seat assembly is to be used to seat a number of people in excess of the number of individual seating positions defined by the contoured seat cover.

A further object of the invention is to provide a contoured seat cover which closely conforms to the shape of the seat back and seat bench of an automotive vehicle bench seat assembly. When the contoured seat cover of the invention is installed it appears to form a part of the seat assembly as manufactured. Unlike conventional automotive vehicle seat covers, it is not apparent that the cover of the invention is removable. Because the panels are formed of fabric, the seat cover of the invention provides a bench type automotive seat with far greater comfort and a far more aesthetically pleasing appearance than conventional automotive vehicle bench seat assemblies, which are typically finished in vinyl or other nondescript plastic.

A further object of the invention is to provide a contoured seat cover for a bench seat of an automotive vehicle which will not slip upon the seat provided as part of the vehicle, and which has undersurfaces which closely conform to the configuration of both the seat back and the seat bench. Such a close fitting arrangement is possible because both the front portion of the seat back cover and the mantle of the seat bench cover are formed of separate, discrete fabric panels which are sewn together. Such a construction not only allows the formation of forwardly and upwardly projecting contoured protrusions but also allows the undersurfaces of the seat cover to closely conform to the shape of the outer surface of the vehicle seat back and seat bench.

Both the front portion of the seat back cover and the mantle of the seat bench cover include edge panels which are sewn to intersect the panels defining the occupant seating positions at acute angles. Conventional automotive bench seat backs are formed with forward surfaces which are somewhat broader than their rear surfaces. Likewise, the seat benches of automotive vehicles having bench seat assemblies are broader across their upper surfaces than at their bases. By providing edge panels which intersect the forward and upper portions of the seat back cover and bench seat cover of the invention at acute angles, the contoured seat cover of the invention conforms closely to the transverse and lateral edges of the vehicle seat back and bench, as well as to the forward surface of the seat back and the upper surface of the seat bench. While the sizes and shapes of the particular panels in each seat back cover and seat bench cover will vary with the particular automotive vehicle bench seat assembly upon which the cover is to be installed, all of the contoured seat covers according to the invention have the foregoing features which provide the advantages hereinbefore described.

A further feature of the invention which prevents the seat cover from slipping and which enhances the comfort of the seat cover is the provision of foam padding secured throughout to the underside of the front portion of the seat back cover and to the underside of the mantle of the seat bench cover. This padding both enhances the comfort of the contoured seat cover and also aids in preventing the seat cover from slipping on the seat back and the seat bench.

Each of the contoured seat covers of the invention defines a plurality of separate occupant seating positions. In smaller bench seat assemblies two occupant seating positions are typically defined by the contoured seat cover which is constructed for the bench seat assembly involved. However, three seating positions are typically defined on contoured seat covers according to the invention which are designed for intermediate and larger sizes of bench seat assemblies.

A further object of the invention is to provide a contoured seat cover which provides lumbar support for the vehicle seat occupants. The seat back cover of the contoured covering according to the invention includes sections of foam padding having an arcuate segment-shaped cross sectional configuration secured behind the front portion of the seat back cover and centered in the lower lumbar region of each backrest position. Because the interior of the seat back cover of the invention so closely conforms to the exterior surface configuration of the seat back encapsulated therewithin, the lumbar supporting cushions will always reside at proper locations within the occupant back rest positions.

The invention may be described with greater clarity and particularity by reference to the accompanying drawings.

DESCRIPTION OF THE DRAWINGS

FIG. 4 is a plan sectional view of a portion of the seat back cover of FIG. 1.

FIG. 6 is a sectional elevational detail taken along the lines 6—6 of FIG. 5.

FIGS. 7, 8 and 9 are plan views showing the patterns of the various separate, discrete fabric panels of the contoured seat cover of the invention prior to assembly.

DESCRIPTION OF THE EMBODIMENT

Figure 1:
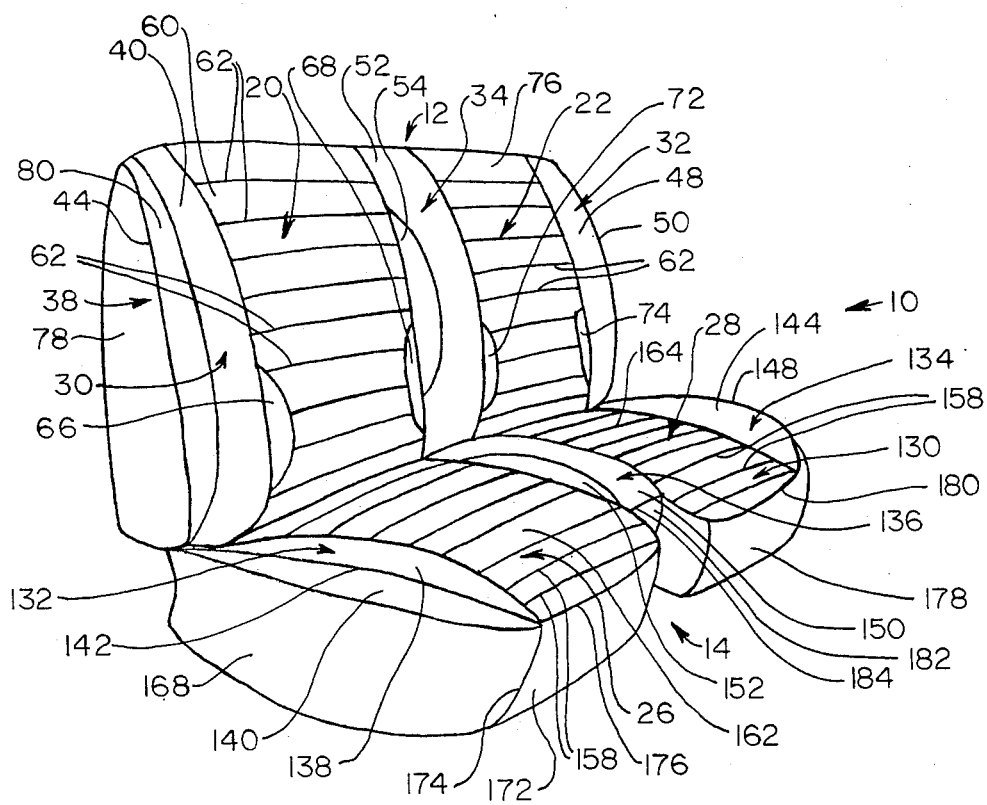
FIG. 1 is a perspective view showing one embodiment of a contoured seat cover according to the invention installed on a bench seat assembly of an automotive vehicle.
Figure 2:
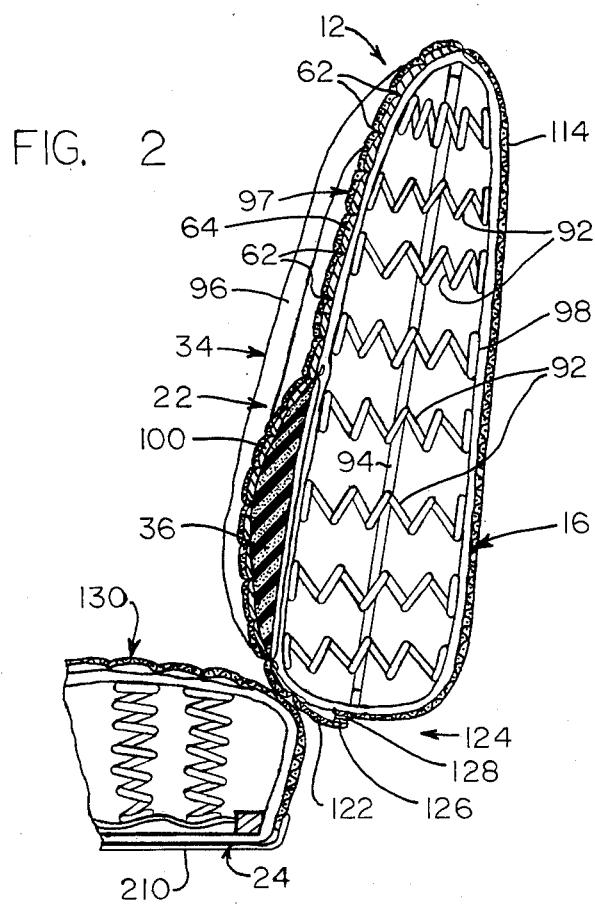
FIG. 2 is a side elevational sectional view of the seat back cover and a portion of the seat bench cover of the contoured seat cover of FIG. 1.

FIG. 1 is a perspective view of a contoured seat cover 10 especially adpated for installation on the bench seat of a 1987 model Nissan automatic transmission truck. The contoured seat cover 10 is comprised of a seat back cover 12 and a seat bench cover 14. The seat back cover 12 includes a plurality of separate fabric panels, depicted in isolation in FIGS. 7 and 8, which are sewn together and adapted to encapsulate the back 16 of a bench seat of an automotive vehicle, as depicted in FIG. 2. Raised foam cushioning 17, visible in FIG. 4, defines a plurality of separate and discrete occupant seat backrest positions 20 and 22, indicated in FIG. 1. The seat bench cover 14 includes a plurality of separate fabric panels, depicted in isolation in FIGS. 7, 8 and 9, sewn together and adapted to cover the bench 24, partially visible in FIGS. 2 and 6, of a bench seat of an automotive vehicle. The seat bench cover 14 further includes raised foam cushioning 18 to define two separate and discrete occupant posterior support positions 26 and 28 which are laterally aligned, respectively, with the occupant seat back rest positions 20 and 22.

The occupant seat back rest positions 20 and 22 are bounded by shoulder cradles 30 and 32 located at opposite lateral extremities of the seat back cover 12, and by a back support divider 34 located between the back rest positions 20 and 22. FIG. 2 is an elevationsl sectional vewi taken at a vertical plane passing through the seat back rest position 22 looking toward the seat back rest position 20. As illustrated in FIG. 2, the seat cover 10 is further comprised of forwardly extending lumbar support cushions 36 located at each of the occupant back rest positions 20 and 22.

Figure 8:
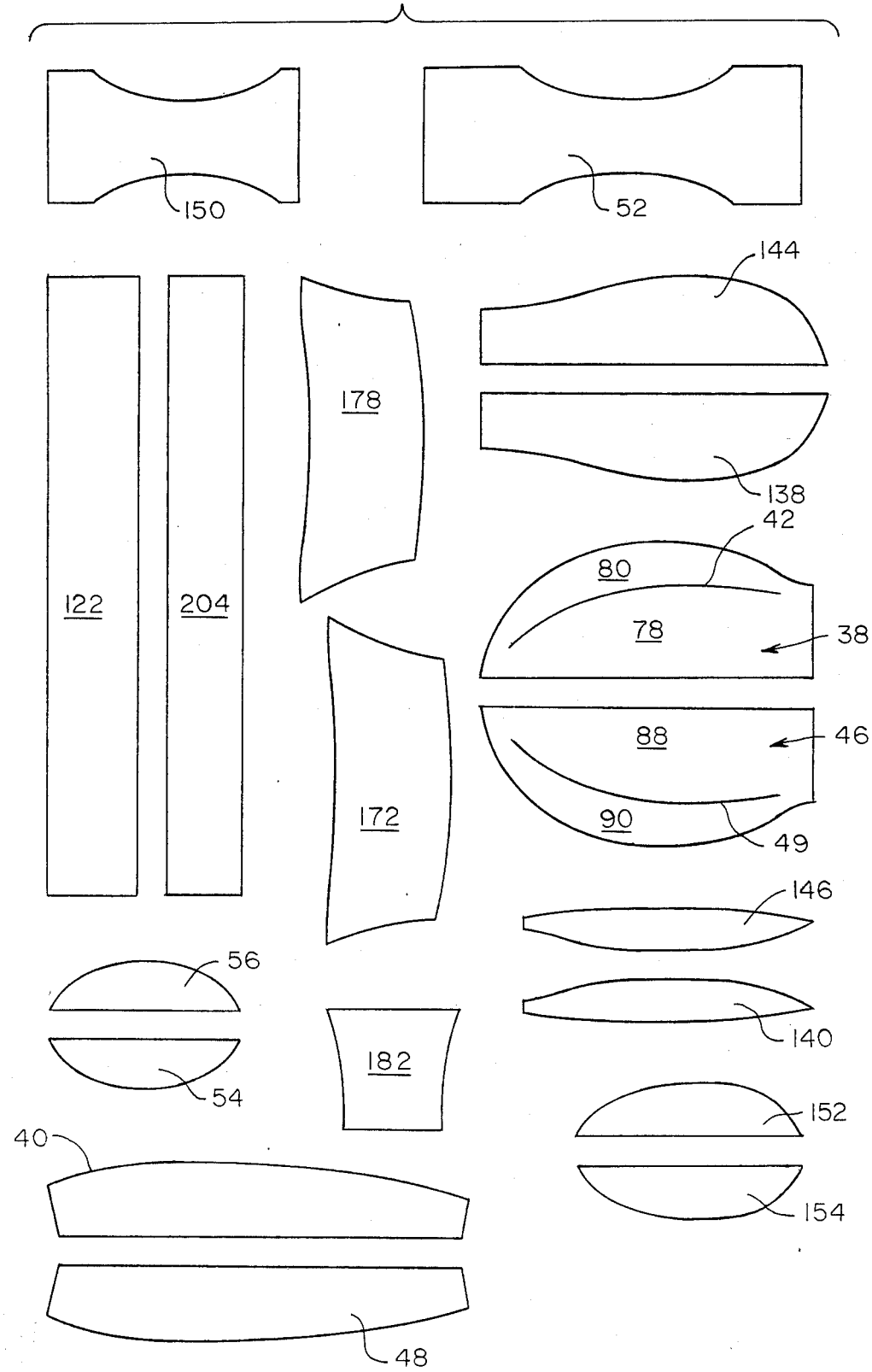

FIG. 4 is a plan view showing the occupant seat back rest position 20 in section. Each of the shoulder cradles 30 and 32 is comprised of a plurality of separate fabric panels sewn together to form concave pockets therewithin adapted to receive the longitudinal edges 82 of the back 16 of a bench seat assembly. The shoulder cradle 30 is depicted in cross section in FIG. 4. The shoulder cradle 30 is formed by the fabric panels 38 and 40, depicted separately in isolation in FIG. 8, which are sewn together to form a generally triangular-shaped concave cavity 81 as best illustrated in FIG. 4. The fabric panel 38 is cut with an arcuate slit 42 therein which divides the panel 38 into two portions 78 and 80. The adjacent edges of the portions 78 and 80 of the fabric panel 38 at the slit 42 are sewn together in a seam indicated at 44 in FIGS. 1 and 4. Similarly, the fabric panels 46 and 48, also depicted in isolation in FIG. 8, are sewn together to form the shoulder cradle 32. Like the fabric panel 38, the fabric panel 46 is originally formed with a slit 49 therein which divides the panel 46 into portions 88 and 90. The adjacent edges of the portions 88 and 90 are sewn together at the seam 50, depicted in FIG. 1.

The shoulder cradles 30 and 32 serve as forwardly projecting occupant back rest position delineating protrusions. The underside of each of these protrusions forms a concave back rest position delineating cavity 81 having a generally triangular-shaped cross section. Each cavity 81 is occupied by an elongated foam cushion 17 disposed therewithin. The cushion 17 of the shoulder cradle 30 is held at one end of the seat back cover 12 in the cavity 81 defined between the fabric panels 38 and 40, as depicted in FIG. 4. A foam cushion is similarly disposed in the concave cavity defined at the opposite lateral end of the seat back cover 12 behind the panels 46 and 48, which are sewn together to form the shoulder cradle 32.

Figure 3:
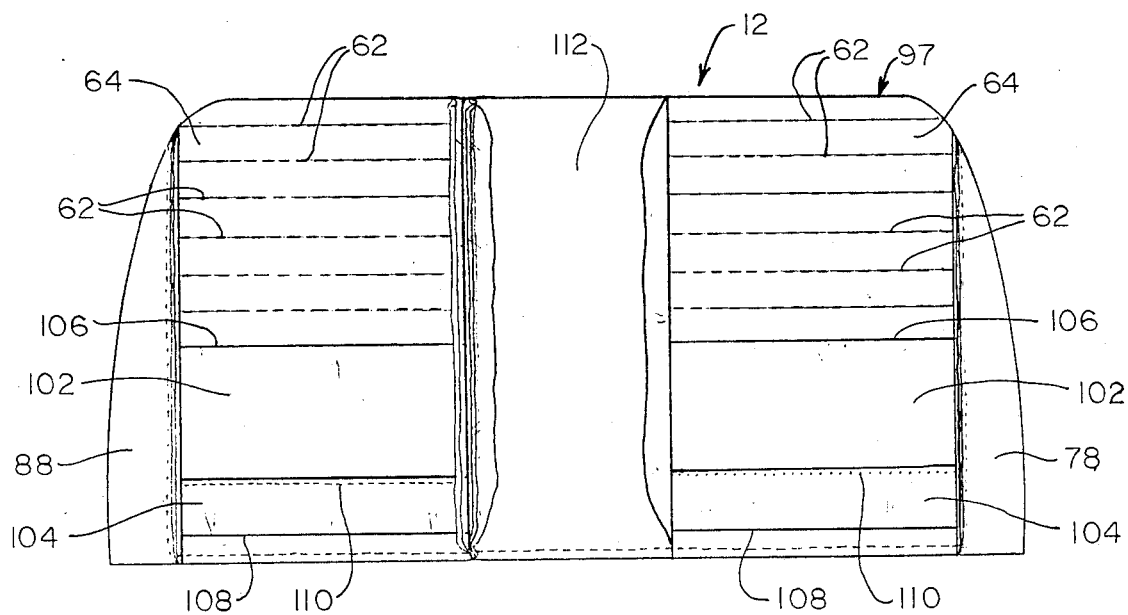
FIG. 3 is a rear elevational view of the reverse side of the front portion of the seat back cover of FIG. 1.

The back support divider 34 is located between the back rest positions 20 and 22 and serves as a forwardly projecting occupant back rest divider. The back support divider 34 is comprised of a plurality of fabric panels 52, 54 and 56, illustrated in isolation in FIG. 8, which are sewn together to form a back rest position divider cavity therebehind. The raised foam cushioning includes a foam back divider cushion 58 which is secured in the back rest position divider cavity, as depicted in FIG. 4. The oval segment-shaped fabric panels 54 and 56 are sewn into arcuate cutouts in the fabric panel 52 so that the back support divider 34 projects forwardly to serve as a demarcation between the back rest positions 20 and 22. A rectangular fabric seat back panel 60, depicted in isolation in FIG. 9, is sewn along its edges to the fabric panels 68, 52 and 54 at the inner edge of the occupant back rest position 20. The back rest panel 60 has horizontal lines of stitching 62 which extend laterally across the length of the panel 60 to secure a corresponding rectangle of foam padding 4 therebehind, as depicted in FIGS. 2, 3 and 4.

Oval sector-shaped lumbar projection panels 66 and 68 are sewn to the lateral edges of the fabric panel 60 in the lumbar region thereof to allow the lumbar cushioning 36 to project forwardly at the occupant back rest position 20. The straight edge of the panel 66 is sewn to the juxtaposed edge of the panel 40, while the straight edge of the fabric panel 68 is sewn to the juxtaposed edges of the fabric panels 52 and 54. Similarly, the oval sector-shaped fabric lumbar projection panels 72 and 74 are sewn to the lateral edges of the rectangular seat back rest panel 76 in the lumbar region thereof to allow another foam cushion 36 to project forwardly as a lumbar support at the occupant back rest position 22. The straight edge of the fabric panel 72 is sewn to the adjoining edges of the center divider panel 52 and the panel 56, while the straight edge of the lumbar projection panel 74 is sewn to the adjoining edge of the fabric panel 48. Horizontal lines of stitching 62 likewise secure a rectangle of foam padding 64 to the underside of the back rest panel 76.

The portions 78 and 88 of the panels 38 and 46, respectively, serve as edge panels which are sewn to form acute angles with the foam cushions 17 at the shoulder cradles 30 and 32. As illustrated in FIG. 4, the edge panel formed by portion 78 of the panel 38 forms an acute angle with the cloth retainer backing 79 behind the cushion 17 to define a sector-shaped pocket therebetween which is adapted to receive and grip the longitudinal edge 82 of the seat back 16. A section of foam padding 84 is sewn to the underside of the portion 80 of the panel 38 while a different foam padding section 86 is sewn to the underside of the portion 78 thereof. Similarly, the portion 88 of the edge panel 46 serves as an edge panel and is drawn into an acute angle relative to the other cushions 17 so as to define a pocket to receive and grip the opposite longitudinal edge of the seat back 16. The acute angles formed by the panel portions 78 and 88 of the fabric panels 38 and 46 with the cushion 17 enhance the close conformity of the seat back cover 12 to the configuration of the vehicle seat back 16.

The vehicle seat back 16 is formed of a plurality of coil springs 92 mounted on a generally rectangular metal frame 94 which, with the springs 92, is encapsulated within a vinyl seat covering having a front surface 96 and a rear surface 98, as depicted in FIG. 2. In conventional bench type seat assembly construction, the front surface 96 of the seat back 16 is normally broader than the rear surface 98. Thus, when viewed in plan cross section the seat back 16 assumes a generally trapezoidal configuration, the larger base of which is formed by the front surface 96 and the smaller base of which is formed by the rear surface 98. The acute angles formed between the two portions 78 and 88 of the fabric panels 38 and 46 with the front surface 96 of the seat back 16 allow the seat back cover 12 to accommodate the generally trapezoidal configuration of the seat back 16, so that the portions 78 and 88 of the fabric panels 38 and 46 closely hug the opposite, longitudinal edges 82 of the seat back 16, as best depicted in FIG. 4. The acute angles formed within the seat back cover 12 significantly enhance the close conformity of the seat back cover 12 to the outer surface configuration of the seat back 16, and substantially reduce the tendency of the seat back cover 12 to slide upon the surface of the seat back 16.

The fabric panels 38, 40, 66, 60, 68, 54, 52, 6, 72, 76, 74, 48 and 46 are sewn together as depicted and described and together form a front portion 97 of the seat back cover 12. The front portion 97 of the seat back cover 12 has polyurethane foam padding secured throughout to its underside. The foam padding is comprised of a plurality of separate pads, such as the foam pads 84, 86 87, 64, 89, 59, 101 and 100 depicted in FIGS. 2, 3 and 4. As previously noted, the lumbar support cushions 36 are located behind the foam cushion pads 64 which reside in contact throughout with the undersides of the fabric panels 60 and 76. The raised foam cushions 36 are held in position by cloth retaining flaps 102 and 104, which are respectively sewn to the back rest panels 60 and 76 and the foam pads 64 therebeneath by lines of stitching indicated at 106 and 108 in FIG. 3. The flaps 102 and 104 are initially separated, so as to admit the raised lumbar support cushions 36, and are closed together to encapsulate the raised foam cushions 36 by lines of stitching indicated at 110 in FIG. 3.

Similarly, the raised foam cushion 58 behind the divider panel 52 is held encapsulated against foam pads 89, 59 and 101 by means of a rectangular cloth retainer 112 which is secured by stitching along all of its edges to the front portion 97 of the seat back cover 12.

The front portion 97 of the seat back cover 12 is viewed in isolation from its underside in FIG. 3. The rear portion 114 of the seat back cover 12 is formed of a single, large fabric panel and is depicted in FIG. 2 and in isolation in FIG. 7, but is omitted from the view of FIG. 5 to permit illustration of the underside of the front portion 97. The rear portion 114 is formed entirely of fabric and does not include foam padding secured to its underside as does the front portion 97. The rear portion 114 is sewn along its upper edge to the upper edges of the back rest panels 60 and 76 and the center divider panel 52. The upper corners of the rear portion 114 are sewn to the upper edges of the fabric panels 40 and 48. The lateral edges of the rear portion 114 are sewn to the rearward extremities of the portions 78 and 88 of the fabric panels 38 and 46. A pair of slits 116 are defined in the lower edge 118 of the rear portion 114 to accommodate the hinge arms which hold the seat back 16 upright, and square openings 120 are defined in the rear portion 114 to accommodate and provide access to the hinge locking levers of the seat back 16.

The back portion 114, and the front portion 97, together form a tight fitting envelope for encapsulating the seat back 16. A transverse marginal fabric edge flap 122 is sewn along the lower edges of the back rest panels 60 and 76 and to the center divider panel 52 to form one lower edge of the envelope. The marginal edge flap 122 and the lower edge 118 of the rear portion 114 of the seat back cover 12 together define a mouth of the envelope.

A releasable fastening means 124 is provided for releasably securing the mouth closed to encapsulate the seat back 16 therewithin, as depicted in FIG. 2. Preferably, the releasable fastening means 124 is comprised of a first strip 126 which is sewn lengthwise along the exposed side of the flap 122. The strip 126 has a multiplicity of minute plastic hooks secured along the edge of the mouth defined by the marginal flap 122. A second strip 128 is sewn transversely across the underside of the rear portion 114 at the lower edge 118 thereof. The strip 128 has a multiplicity of minute loops of pile secured along the edge 118 defining the envelope mouth. The hooks of the strip 126 are releasably interengagable with the loops of the pile of the strip 128 to releasably secure the mouth closed in the manner depicted in FIG. 2. The interengagable strips of hook and pile are sold commercially under the product designation Velcro.

The seat bench cover 14 includes a fabric mantle 130 that fits over the seat bench 24, which is partially visible in FIGS. 2 and 6. The mantle 130 is formed of a plurality of separate, discrete fabric panels which are sewn together, as will hereinafter be described, to define the upwardly projecting thigh cradles 132 and 134 which are located at the opposite lateral extremities of the seat bench cover 14, and at least one posterior support position divider 136 which is located between the adjacent posterior support positions 26 and 28. The thigh cradles 132 and 134 provide the outer lateral boundaries of the posterior support positions 26 and 28, while the posterior support position divider 136 forms the inner lateral boundaries thereof.

The thigh cradles 132 and 134 serve as upwardly projecting occupant posterior delineating protrusions and define posterior position delineating cavities thereneath. Each of the posterior position delineating cavities is occupied by a generally wedge-shaped foam cushion 18, one of which is visible in FIG. 6.

The thigh cradle 132 is formed by discrete fabric panels 138 and 140, depicted in isolation in FIG. 8. The panels 138 and 140 are sewn together by a seam 142, as depicted in FIGS. 1 and 6. Similarly, the discrete fabric panels 144 and 146 are sewn together along a seam 148 to form an occupant posterior position delineating thigh cradle 134 and a posterior position delineating cavity therebeneath. The cavity beneath the thigh cradle 134 likewise is occupied by a wedge-shaped foam cushion 18.

At the center of the seat bench cover 14 the upwardly projecting occupant posterior position divider 136 is formed by discrete fabric panels 150, 152 and 154, which are sewn together. The panels 150, 152 and 154 are depicted in isolation in FIG. 8. The oval segment-shaped panels 152 and 154 are sewn by lines of stitching into concave arcuate recesses in the fabric panel 150 so as to define a posterior position divider cavity therebeneath. A foam cushion 156 is disposed in the posterior position divider cavity and causes the center divider panel 150 to project upwardly between the occupant posterior support positions 26 and 28, as depicted in FIGS. 1 and 6.

Fabric posterior support position panels 162 and 164 are used to form the central regions of the occupant posterior support positions 26 and 28. The panels 162 and 164 are rectangular fabric panels having horizontal lines of stitching 158 thereacross and are depicted in isolation in FIG. 9. The lines of stitching 158 secure rectangular foam padding panels 160, visible in FIG. 5, to the undersides of the fabric panels 162 and 164. Slits 165 are formed near the rear corners of the fabric panels 162 and 164 to accommodate the hinge arms of the seat back support.

Figure 5:
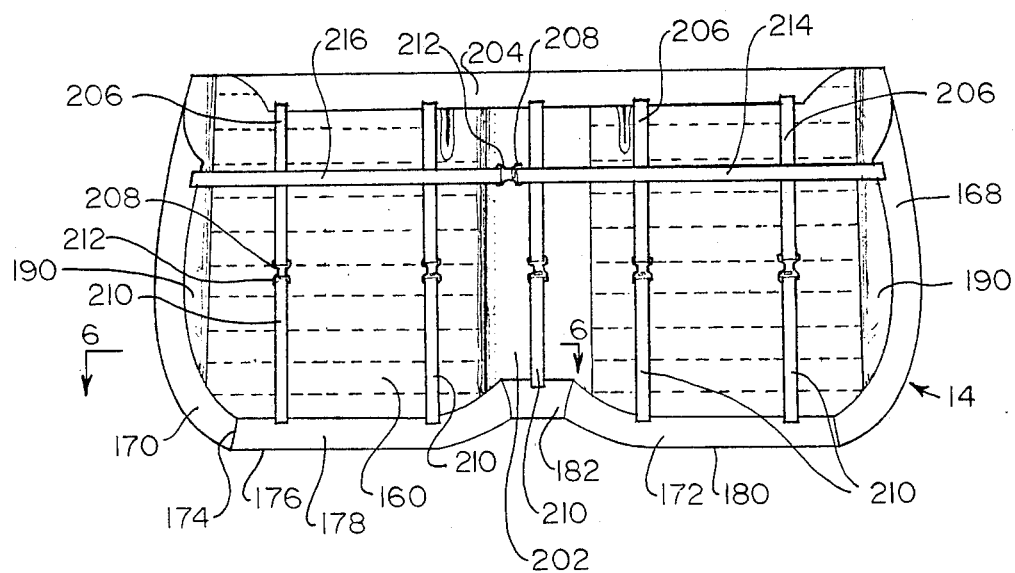
FIG. 5 is a bottom plan view from the underside of the seat bench cover of the contoured seat cover of FIG. 1.

The seat bench 24 is omitted from the view of FIG. 5 to permit illustration of the underside of the mantle 130. The posterior support position panel 162 is located at the posterior support position 26 and is sewn along one lateral edge to the fabric panel 138 and along its opposite lateral edge to the fabric panels 150 and 152. The posterior support position panel 164 is located at the posterior support position 28 and is secured by stitching along one lateral edge to the adjoining fabric panel 144 and along its opposite edge to the center divider panel 150 and the oval segment-shaped panel 154.

The seat bench cover 14 is comprised of several fabric panels sewn together to form concave pockets therewithin beneath the thigh cradles 132 and 134. These pockets are adapted to receive the opposing lateral edges 166 of the bench 24 of the vehicle seat bench assembly, one of which is depicted in FIG. 6. A fabric edge panel 168 is sewn to the fabric panel 140 beneath the thigh cradle 132, while a corresponding fabric edge panel 170 is sewn to the fabric panel 146 on the driver's side of the vehicle seat beneath the thigh cradle 134. Another fabric edge panel 172 is sewn to the forward edge of the fabric panel 168 at a seam 174. The top edge of the fabric panel 172 is sewn to the forward edge of the panel 162 at a seam 176. Similarly, the panel 178 is sewn to the forward edge of the panel 170 and to the forward edge of the fabric panel 164 by a seam 180.

Because the Nissan automatic truck seat bench assembly includes a center indentation in the seat bench to accommodate the transmission shifting lever, there is a central indentation between the occupant posterior support positions 26 and 28. Accordingly, the interior ends of the fabric panels 172 and 178 turn rearwardly and are sewn along their interior edges to the edges of another fabric panel 182. The upper edge of the panel 182 is sewn to the panel 150 by a seam 184.

As illustrated in FIGS. 1, 5 and 6, fabric panels 168 and 172 are edge panels sewn to intersect the occupant posterior position delineating protrusion formed by the thigh cradle 132 at an acute angle. That is, each wedge-shaped foam cushion 18 which occupies a cavity beneath the fabric panels 140 and 138 and the panels 144 and 146 is held in position by a cloth retainer 190 which is sewn to the underside of the mantle 130 through foam pads 192 and 194. The cloth retainer 190 depicted in FIG. 6 is sewn to the fabric panels 138 and 162 and to the fabric panels 140 and 168.

The angle between the edge panel 168 and the cloth retainer 190 is an acute angle. The cloth retainer 190 and the edge panel 166 thereby define a pocket which is adapted to receive and grip a longitudinal edge 166 of the seat bench 24, as depicted in FIG. 6. The front fabric panel 172 is likewise angled downwardly and rearwardly from the fabric panel 162 to likewise form a pocket for entrapping the forward edge of the bench seat 24. Similarly, the fabric panels 170 and 178, together with the fabric panels 144, 146 and 164 likewise define a pocket to receive and grip the edges of the seat bench 24 at the opposite end thereof.

Polyurethane foam pads are secured throughout to the underside of the mantle 130. The mantle 130 is formed by the fabric panels 162, 164, 138, 144, 140, 146, 150, 152, 154, 168, 170, 172, 178 and 182. Certain of the foam pads of the mantle 130 are visible at 160, 192, 194, 195 and 200 in FIGS. 2 and 6. A rectangular retaining cloth 202 holds the raised foam posterior position divider cushion 156 at the underside of the fabric panels 150, 152 and 154 and against the foam padding 200 in the posterior position divider cavity formed beneath the fabric panels 150, 152 and 154.

The seat bench cover 14 also includes a rear marginal fabric flap 204, sewn to the rear edges of the fabric panels 162, 150 and 164. The marginal flap 204 is not provided with foam padding, but includes four laterally spaced straps 206, each having a releasable female clasp element 208 at the extremity thereon. Corresponding straps 210 are laterally aligned with the straps 206 and are sewn to a fabric bead sewn into the lower edge of the fabric panels 172, 182 and 178. Each of the straps 210 has a male clasp element 212 which is releasably engageable with the female element 208. The clasp elements 208 and 212 are sold in sets as clasps, model SR-3/4 by Fastex of Des Plains, Ill. 60016. Similarly, straps 214 and 216 are respectively secured to beads at the lower edges of the fabric panels 168 and 170 and likewise terminate, respectively, in the clasp elements 208 and 212. The straps 210 and 216 are adjustable in length through a conventional cinch locking mechanism.

Together, the straps 206, 210, 214 and 216 may be used to attach the mantle 130 for releasable securement to the seat bench 24. The clasps formed by the clasp elements 206 and 208 may be engaged by reaching underneath the seat bench 24 without removing the seat bench 24 from its supporting frame. The seat bench cover 14 may thereby be removably installed on the seat bench 24 by a single person while the seat bench 24 remains unmoved in position on its frame. Similarly, the seat back cover 12 may be installed on the seat back 16 by a single person while the seat back 16 remains in its normal position in the cab of a vehicle.

To install the seat bench cover 14, the mantle 130 is positioned atop the seat bench 24, as illustrated in FIG. 1. Although the edge panels 160, 170, 172 and 178 are tapered downwardly and inwardly relative to the seat bench 24, the fabric and cushioning material is sufficiently resilient so that the mantle 130 can be stretched to the extent necessary to bring the lower edges of the edge panels 168, 170, 172, 178 and 182 down beneath the lower edge of the seat bench 24. The marginal flap 204 is pressed rearwardly into the crevice between the seat bench 24 and the seat back 16 and the straps 206, 208, 214 and 216 are secured by an individual standing over the seat bench 14 while reaching underneath the seat bench 24. The clasp elements 208 and 212 are easily engageable and may be located and engaged using the tactile senses only, without the necessity for direct observation.

To install the seat back cover 12, the strips 126 and 128 are disengaged from each other and the envelope formed by the front portion 97 and the rear portion 114 of the seat back cover 12 is then pulled downwardly over the seat back 16. The marginal flap 122 is then pressed into the crevice between the seat bench 24 and the seat back 16 and wrapped around to meet the lower edge 118 of the rear portion 114 of the seat back cover 12. The Velcro strips 126 and 128 may thereupon be engaged along their lengths using the tactile senses only, also without the need for direct observation.

Figure 7:
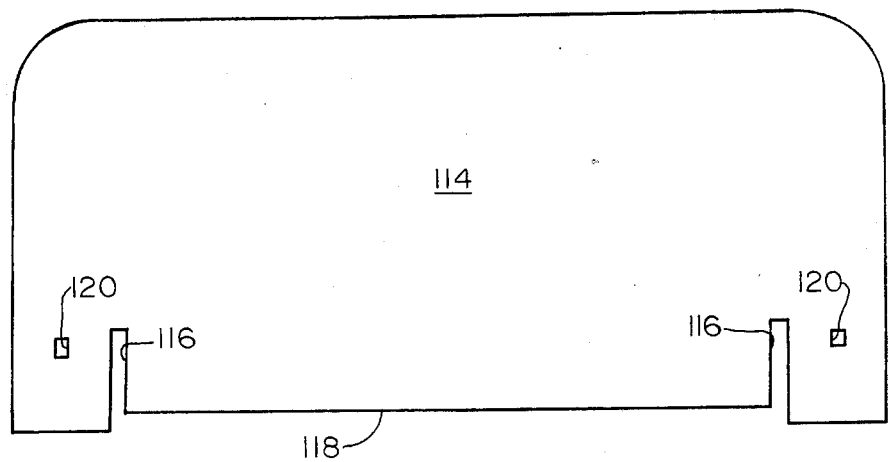
Figure 7:
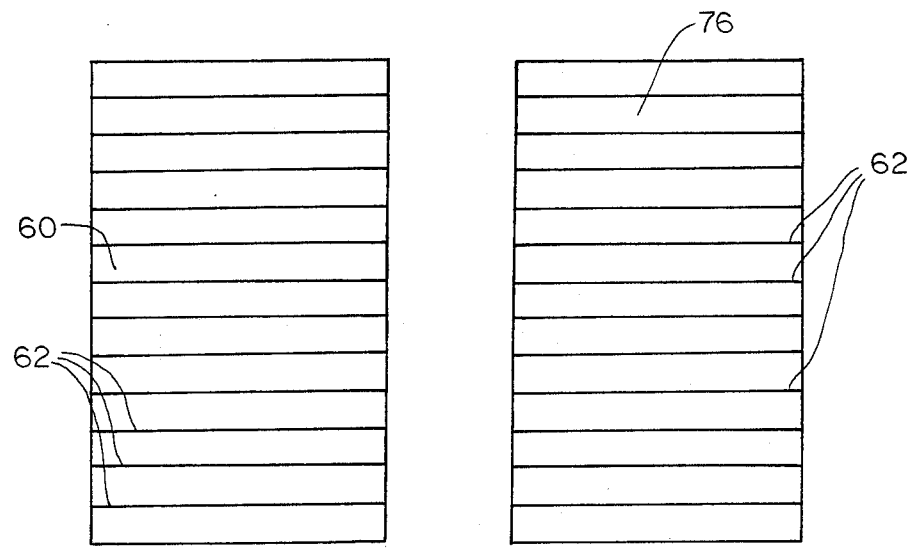
Figure 7:
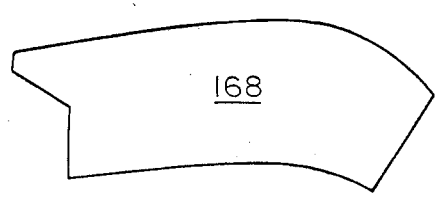
Figure 7:
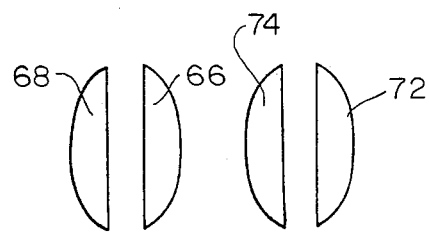
Figure 7:
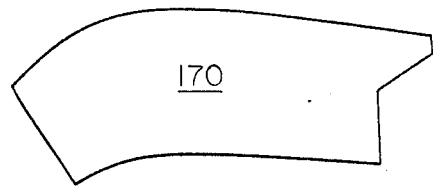

By varying the specific configurations and dimensions of the fabric panels of FIGS. 7, 8 and 9, a contoured seat cover may be produced according to the invention for any bench type seat of an automotive vehicle. In all embodiments the seat cover of the invention will include a seat back cover formed of a plurality of separate fabric panels sewn together and a bench cover likewise formed of a plurality of separate fabric panels sewn together. As in the embodiment illustrated, each seat back cover includes at least two adjacent back support panels separated by a back support divider panel located between each two adjacent back support panels. A back support divider cushion is located behind each back support divider panel to raise each back support divider panel forward from the two adjacent back support panels. Shoulder cradling panels are located at opposite lateral ends of the back cover next to adjacent back support panels. Shoulder cradle cushions are located behind each shoulder cradling panel to raise the shoulder cradling panel forward from the back support panel located adjacent thereto. Each seat back cover includes a backside panel having a top edge sewn to the back support divider panels and to the back support panels and side edges secured to the shoulder cradling panels. The seat back cover includes fastening means for releasably securing the bottom edges of the back support panels to the bottom edge of the backside panel to envelope a vehicle seat back therewithin.

Each bench cover of the contoured seat cover of the invention has at least two adjacent posterior support panels which are located in lateral alignment with the back support panels of the seat back cover. A seating position divider panel is located between each two adjacent posterior support panels. A seating position divider panel cushion is located beneath each seating position divider panel to raise each seating position divider panel upward from each of the two adjacent posterior support panels. Thigh cradling panels are located at opposite ends of the bench cover next to adjacent posterior support panels. Thigh cradling cushions are located beneath each thigh cradling panel to raise the thigh cradling panels upwardly from the posterior support panels. Some form of fastening means is required for securing at least the forward and rear edges of the posterior support panels relative to each other. Preferably the bench cover fastening means is comprised of adjustable straps and clasps thereon.

Undoubtedly, numerous variations and modifications of the invention will become readily apparent to those familiar with automotive vehicle seat covers. For example, it is to be understood that the configuration of the several fabric panels is likely to vary significantly to accommodate different bench seat assemblies for different automotive vehicles. Indeed, in contrast to the seat bench 24 illustrated in association with the embodiment of the invention depicted and described, many seat benches do not include a center indentation, so that no corresponding seat bench cover indentation will be required to cover such seat benches. Accordingly, the scope of the invention should not be construed as limited to the specific embodiment thereof illustrated and described, but rather is defined in the claims appended hereto.

We claim:

1. A contoured seat cover for a bench seat of an automotive vehicle comprising:
    a seat back cover including a plurality of separate fabric panels sewn together and adapted to encapsulate the back of a bench seat of an automotive vehicle and further including raised foam cushioning to define a plurality of separate and discrete occupant back rest positions, and
    a seat bench cover including a plurality of separate fabric panels sewn together and adapted to cover the bench of a bench seat of an automotive vehicle and further including raised foam cushioning to define a plurality of separate and discrete occupant posterior support positions laterally aligned with said occupant back rest positions.

2. A contoured seat cover according to claim 1 wherein said occupant back rest positions are bounded by shoulder cradles located at opposite lateral extremities of said seat back cover and by at least one back support divider located between said back rest positions.

3. A contoured seat cover according to claim 2 wherein said seat back cover is comprised of a plurality of fabric panels sewn together to form concave pockets therewithin behind said shoulder cradles and adapted to receive the longitudinal edges of said back of said seat bench.

4. A contoured seat cover according to claim 2 wherein each back support divider is comprised of a plurality of fabric panels sewn together to form a back rest position divider cavity therebehind, and said raised foam cushioning includes a foam back divider cushion secured in said back rest position divider cavity.

5. A contoured seat cover according to claim 2 further comprising forwardly extending lumbar support cushioning means located at each occupant back rest position.

6. A contoured seat cover according to claim 1 wherein said occupant posterior support positions are bounded by thigh cradles located at opposite lateral extremities of said seat bench cover and at least one posterior support position divider is located between adjacent posterior support positions.

7. A contoured seat cover according to claim 6 wherein said seat bench cover is comprised of a plurality of fabric panels sewn together to form concave pockets therewithin beneath said thigh cradles and adapted to receive the longitudinal edges of said bench of said bench seat.

8. A contoured seat cover according to claim 6 wherein each of said posterior support position dividers is comprised of a plurality of fabric panels sewn together to form a posterior support position divider cavity therebeneath, and said raised foam cushioning includes a foam posterior support position divider cushion secured in said posterior support position divider cavity.

9. A contoured covering for an automotive vehicle bench seat assembly having a seat back and a seat bench comprising:
    a seat back cover formed of a front portion including a plurality of separate, discrete fabric panels sewn together to define forwardly projecting occupant back rest position delineating protrusions, back rest position delineating foam cushions disposed in said back rest position delineating cavities, at least one forwardly projecting occupant back rest position divider with a back rest position divider cavity therebehind, foam cushioning means disposed in said back rest position divider cavity, a rear portion formed of fabric and sewn to said front portion to form a seat back encapsulating envelope with edges defining a mouth, and releasable fastening means for releasably securing said mouth closed to encapsulate said seat back therewithin, and
    a seat bench cover including a mantle which fits over said seat bench and is formed of a plurality of separate, discrete fabric panels sewn together to define upwardly projecting occupant posterior position delineating protrusions and position delineating cavities therebeneath, foam cushions disposed in said posterior position delineating cavities, at least one upwardly projecting occupant posterior position divider with a posterior position divider cavity therebeneath, foam cushion means disposed in said posterior postion divider cavity and straps attached to said mantle for releasable securement at the underside of said seat bench to anchor said mantle on said seat bench, wherein said occupant posterior position delineating protrusions are laterally aligned with said occupant back rest position delineating protrusions and said occupant posterior position dividers are laterally aligned with said occupant back rest position dividers.

10. A contoured seat cover according to claim 9 wherein said seat back cover includes edge panels sewn to form acute angles at said occupant back rest position delineating protrusions, thereby defining pockets adapted to receive and grip the longitudinal edges of said seat back.

11. A contoured seat cover according to claim 9 further comprising foam padding secured throughout to the underside of said front portion of said seat back cover.

12. A contoured seat cover according to claim 9 wherein said releasable fastening means are comprised of a first strip having a multiplicity of minute plastic hooks secured along one of said edges defining said mouth and a second strip having a multiplicity of minute loops of pile secured along another of said edges defining said mouth, and said hooks are releasably interengageable with said loops of said pile to releasably secure said mouth closed.

13. A contoured seat cover according to claim 9 wherein said mantle includes edge panels sewn to intersect said occupant posterior position delineating protrusions at acute angles, thereby defining pockets adapted to receive and grip edges of said seat bench.

14. A contoured covering according to claim 9 further comprising foam padding secured throughout to the underside of said mantle.

15. A contoured covering according to claim 9 wherein said straps are provided with clasps each having mutually interlockable clasp elements.

16. A contoured seat cover for a bench seat of an automotive vehicle comprising;
a seat back cover formed of a plurality of separate fabric panels sewn together including at least two adjacent back support panels, at least one back support divider panel located between each two adjacent back support panels, a back support divider panel cushioning means located behind each back support divider panel to cause each back support divider panel to project forward from each two adjacent back support panels, shoulder cradling panels located at opposite ends of said seat back cover adjacent to ones of said back support panels, shoulder cradle cushion means located behind each shoulder cradling panel to cause said shoulder cradling panels to project forward from said back support panels located adjacent therto, and a backside panel having a top edge sewn to said back support divider panels and said back support panels and side edges secured to said shoulder cradling panels, and back cover fastening means for releasably securing the bottom edges of said back support panels to the bottom edge of said backside panel to envelope a vehicle seat back therewithin, and a bench cover formed of a plurality of separate fabric panels sewn together including at least two adjacent posterior support panels located in lateral alignment with said back support panels, a seating position divider panel located between each two adjacent posterior support panels, a seating position divider panel cushion means located beneath each seating position divider panel to raise each seating position divider panel upward from each two adjacent posterior support panels, thigh cradling panels located at opposite ends of said bench cover adjacent to ones of said posterior support panels, thigh cradling cushioning means located beneath said thigh cradling panels to raise said thigh cradling panels upwardly from said posterior support panels, and bench cover fastening means for securing the front and rear edges of said posterior support panel relative to each other.

17. A contoured seat cover according to claim 16 wherein said bench cover fastening means is comprised of adjustable straps having clasps thereon.

* * * * *